Patented Dec. 31, 1935

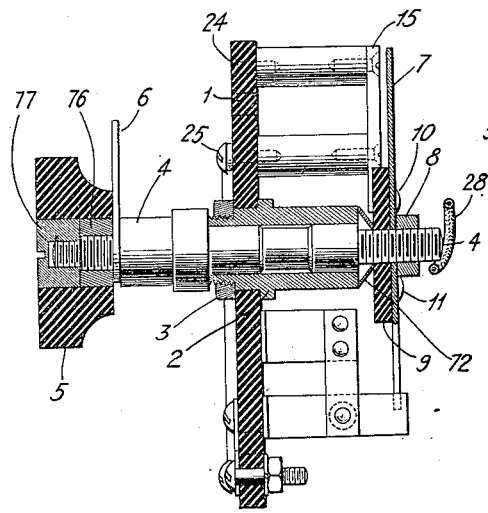

2,026,123

UNITED STATES PATENT OFFICE 2,026,123

IMPROVED DIRECTION FINDER BALANCER

Benjamin L. Dolbear, Belmont, Mass., assignor to Radio Corporation of America, a corporation of Delaware Application January 18, 1932, Serial No. 587,325

6 Claims. (Cl. 250—11)

This invention relates to improved radio direction finder balancers, and more particularly those used in the higher frequency circuits.

An object of this invention is to simplify and improve direction finder balancers.

A further object of this invention is to simplify and so arrange the devices which are associated with a capacity balancer that the maximum efficiency may be obtained when using such an arrangement of parts in the higher frequency direction finder circuit. Likewise, such an arrangement also results in a minimum number of essential parts and thereby reduces the cost of manufacture of such devices.

A feature of this invention is the combining of a sense resistance and a capacity balancer and by an arrangement of a pair of contacts in such a manner that the rotary plate, which is an important element to this invention, may actuate the contacts mentioned above and thereby place the sense resistance in series with one side of a loop when desired to determine the sense of direction from which a signal is coming.

It is well known in the art of direction finding that voltages induced in the loop from sources other than the distant radio transmitter, such as the transmitter energy picked up and reradiated from nearby wires or any other conducting objects produce the same effect as unbalanced symmetry of the loop receiving circuit. Such unbalance or distortion prevents the operator of a direction finder from obtaining a well defined and sharp minimum or null point. Therefore, to improve the minimum a capacity balancer is connected to each side of the loop to balance out any dissymmetry occurring when the loop is rotated. I have found that in a radio direction finder employing the higher frequencies in the order of 1500 to 30,000 kilocycles or short wave lengths, that it is desirable and often necessary to shorten and prevent sharp bends in the leads or wires connecting the plates of a capacity balancer with those of the sense resistance and its associated sense switch. I therefore reduce in number and shorten the wires connecting the loop and the balancer, and also those of the sense resistance, by assembling the sense resistance and the sense switch on a single insulating member. I further arrange the contacts of the sense switch in such a manner that the operating knob of the capacity balancer also serves to operate the sense switch. I am so able to arrange these latter parts for the reason that the capacity balancer is not used when an indication of the sense of direction of the received signal is to be obtained.

The invention consists of various other features and methods of construction as described and illustrated in the accompanying drawing. In the drawing like references refer to like parts, of which—

Figure 1 is a plan view of the assembled devices;

Fig. 2 is a vertical section of Fig. 1, the section being taken at line 2—2;

Fig. 3 is an elevation of Fig. 1;

Fig. 4 is a partial direction finder circuit showing that portion which relates to this invention.

The simplified and improved direction finder balancer is shown in Figs. 1, 2 and 3, wherein the base 1 is of "bakelite dilector" or other good insulating material of low dielectric loss. Mounted upon this base is a central bearing or bushing 2 which is held in position by the bearing nut 3. An operating shaft 4 is provided with an insulated knob 5, and a pointer 6, and locked to the shaft by means of members 76 and 77. On the opposite end of the shaft 4 is mounted a single rotary condenser plate 7 which is held securely in position by means of a nut 8, a collar 9, and rivets 10, 11, 12 and 13. A spring 72 provides proper friction for the shaft. Directly below the rotary plate 7, but spaced about one thirty-second of an inch, there are located two fixed plates 14 and 15 respectively, each of which are of equal area and spaced an equal distance from the center of the rotor shaft 4 so that the capacity of each plate will be approximately the same with respect to the center of the rotary plate 7 when it is in a horizontal position. These fixed plates 14 and 15 are secured to the base 1 by means of metallic supports 16, 17, 18 and 19, and fastened by means of screws 20, 21, 22, 23, 24, 25, 26 and 27. A flexible lead 28 is secured to the rotary plate shaft which in turn connects by means of a backstop spring member 75 to the sense switch contact 29. A relatively short connecting strip 30 connects the contact 29 with the terminal screw 31, washer and nut 32 and 33. The other contact 34 of the sense switch is connected by means of a strip 35 to a clip 36, providing the mounting of the sense resistance 37. The other sense resistance clip 38 is connected to the fixed condenser plate 15 by a lead 40 and thence by another lead 41 to the terminal screws 42, washers 43, and nuts 44. The other fixed plate 14 is connected from the screw 22 by means of a lead 45 to the terminal screw 46, washer 47, and nut 48. The base 1 is further provided with suitable apertures 49, 50, 51 and 52, for mounting the device on the panel of the direction finder receiving apparatus.

Referring now to Fig. 4, a wiring diagram of this device is enclosed within the dot and dash line, also the external parts of the circuit are included, which have not been previously mentioned. There is shown a loop 53, grounding condenser 54, ground 55, sense antenna 56, tuning condenser 57, vacuum tubes 58 and 59, with input grids 60 and 61, filaments 62 and 63, with filament rheostat 64, and battery 65 which indicate the filament supply for the vacuum tubes 58 and 59, plates 66 and 67 which form the input of a superheterodyne receiver 73 comprising a local oscillator 74, first and second detectors 68 and 69 respectively, and a sufficient audio stage 70 to give the desired signal strength for the phones 71.

In the operation of this improved balancer the operator first sets the pointer 6 on zero, which is a position wherein each of the fixed plates 14 and 15 are covered by the rotary plate 7 by substantially an equal area. Then assuming a beacon station is being received, by listening in the phones 71 he carefully sets the loop 53 at a position of minimum signal response. The knob 5 is then rotated slowly in each direction until a position is found that will further reduce the strength of the signal. It then may be necessary for him to obtain a more accurate setting by slight readjustment of the loop and then again the balancer. This position will be the line position of the received signal, and unless the operator knows the approximate source of the signal in respect to his position, he will next find it necessary to determine whether the signal is ahead of or behind him. Therefore, with the loop remaining in the position of minimum signal response mentioned above, the operating knob 5 is rotated as far as possible toward the contact 29. In this position the rotary plate 7 will close the contacts 29 and 34 and in such a position the sense resistance 37 is then placed in series with the sense antenna and one side of the loop 53. The loop is then rotated through 90 degrees from the null point and the operator then notes whether the signal increases or decreases in strength. The position of increased response will indicate the direction from which the signal is coming.

Although this invention has been described as embodied in a particular form and arrangement of parts, it should be understood that it is capable of embodiment in other and different forms within the spirit and scope of the appended claims.

What I claim is:

1. In a radio direction finder comprising a sense antenna, a loop, a capacity balancer having mounted upon a common insulating base a central bearing for a rotary plate, a resistance, a pair of oppositely disposed fixed plates, a plurality of upwardly extended support posts for supporting said pair of fixed plates which are connected to one side of said loop and are oppositely disposed in respect to the shaft of said rotary plate, a pair of upward extending spring contact members having relatively fixed and movable contacts, the movable contact electrically connected to said sense antenna and the rotary plate and being arranged on the base at right angles to each of said fixed plates and positioned in the path of said rotary plate so as to make electrical connection to the relatively fixed contact when the rotary plate is rotated past the position beyond the active capacity area of at least one of the fixed plates to close the contacts and to electrically connect said sense antenna in series with said resistance which is electrically connected on one end to said fixed contact and on the other end to one side of the loop to indicate the sense of direction of an incoming wave.

2. In a radio direction finder capacity balancer for an open and closed antenna system comprising a loop antenna, a sense antenna, said capacity balancer having a fixed plate electrode connected to each side of said loop antenna, said capacity balancer having mounted on a common base a rotary plate having a central shaft, said fixed plate electrodes oppositely disposed in respect to the shaft of said rotary plate, a pair of spring members having relatively fixed and movable contacts, the movable contact being electrically connected to the rotary plate and positioned adjacent said shaft to make an electrical connection with the relatively fixed contact by means of the edge of said rotary plate moving the movable contact toward said relatively fixed contact when said rotary plate is rotated in a position beyond the area of at least one of the fixed plates so as to electrically connect said sense antenna in series with a resistance which is electrically connected on one end to said fixed contact and to one of said fixed plates on the other end so as to be connected in series with one side of said loop to indicate the sense of direction of an incoming wave when said contacts are closed.

3. In a uni-lateral receiving circuit comprising an open antenna, a closed antenna, said closed antenna having in combination a capacity balancer comprising a rotary plate and a pair of oppositely disposed fixed plates, a switch having relatively fixed and movable contacts and a resistance mounted on a base, one side of said resistance being electrically connected to at least one of said fixed plates and said closed antenna, each side of said closed antenna electrically connected to one of the oppositely disposed fixed plates, said rotary plate being electrically connected to said relatively fixed contact and said open antenna, means for electrically connecting the other side of said resistance to one side of said movable contact by means of the edge of said rotary plate moving said movable contact toward said relatively fixed contact so that the resistance and said open antenna are connected in series with one side of said closed antenna to indicate the sense of direction of the received energy.

4. A radio direction finder capacity balancer for an open and closed antenna system including a loop and an open antenna, comprising an insulated member for mounting a rotary plate, a shaft for rotating said rotary plate, a pair of fixed plates each of which are connected to said loop and oppositely disposed in respect to the shaft of said rotary plate, a resistance located on said insulated member, relatively fixed and movable spring contact members arranged on said insulated member to make and break electrical contacts, at least one of said contacts being connected to one side of said resistance, the other side of said resistance being connected to one of said fixed plates and said fixed contact member, said other contact being positively connected to said rotary plate and intermittently to said open antenna by means of said rotary plate moving in a path so as to close said contacts for electrically connecting in series said open antenna with one side of said loop, for indicating the sense of direction of an incoming wave.

5. A uni-lateral receiving energy responsive circuit comprising a closed antenna and an open antenna, said closed antenna forming a circuit, a resistance and a switch, said switch having fixed and movable contacts, a pair of fixed condenser plates substantially of the same area, each of said fixed plates being connected to one side of said closed antenna, and a rotary plate connected to the open antenna circuit and to said movable contact on said switch, the fixed contact of said switch being connected to one side of said resistance, the other side of said resistance being connected to at least one of said fixed plates, means for closing said contacts to provide connections to one side of said closed antenna, the resistance and said fixed contact for placing said resistance in series with said open antenna circuit when said plate is rotated to an unbalanced position in which said rotary plate substantially covers only the area of one of said fixed plates to indicate the sense of direction of energy response.

6. In a radio direction finder comprising a sense antenna, a loop, a capacity balancer having a base on which is mounted a rotary plate, a resistance, a pair of oppositely disposed fixed plates, said fixed plates being connected to each side of said loop and are oppositely disposed in respect to the center of said rotary plate, a pair of contact members one of which is electrically connected to said sense antenna and the rotary plate and arranged on the base at right angles to each of said fixed plates and positioned in the path of said rotary plate so as to make electrical connection by closing said contacts when the rotary plate is rotated past the position beyond the active capacity area of at least one of the fixed plates to electrically connect said sense antenna in series with said resistance which is electrically connected to one of said contacts, and the other end of said resistance being connected with one side of said loop to indicate the sense of direction of an incoming wave when said rotary plate closes said contacts.

BENJAMIN L. DOLBEAR.